United States Patent Office 2,716,137
Patented Aug. 23, 1955

2,716,137

CATALYTIC CONDENSATION OF α,β ALKYLENE OXIDES

John T. Patton, Wyandotte, Mich., assignor to Wyandotte Chemicals Corporation, Wyandotte, Mich., a corporation of Michigan No Drawing. Application July 5, 1952,
Serial No. 297,403

3 Claims. (Cl. 260—615)

The present invention relates to a method of preparing oxyalkylene compounds which comprises condensing an α,β alkylene oxide with an active hydrogen compound in the presence of a catalyst selected from the group consisting of benzyltrialkylammonium hydroxides and benzyltrialkylammonium alkoxides.

α,β Alkylene oxides are versatile and highly reactive chemicals that undergo a wide variety of reactions to prepare valuable products. In particular, active hydrogen compounds react with α,β alkylene oxides, e. g. ethylene oxide, to form monoderivatives of glycols corresponding to the alkylene oxide, viz:

In the above formula YH represents any reactive hydrogen compound wherein H represents the reactive hydrogen atom and Y represents the balance of the compound, e. g. the CH₃O-radical when the reactive hydrogen compound is methanol. The terminal hydroxyl group of the intermediate compound illustrated above can react with the α,β alkylene oxide and in this manner polyoxyalkylene compounds are formed, viz:

The term "active hydrogen compound" is well understood in the art and as used herein includes any compound containing one or more hydroxyl group, carboxylic acid group, carboxylic acid amide group, a primary or secondary amine, a phenol or thiophenol group, a sulfonamide group, an imide group or a marcaptan group.

Of the many catalysts which have been employed in these reactions, the most efficient and widely used are strong inorganic bases such as sodium hydroxide and sodium alkoxides. While such strong alkaline catalysts are widely used, they have many shortcomings which are apparent to the art. For example, in recent years there has been a growing demand for very high molecular weight polyoxyalkylene compounds in the detergent and synthetic lubricant art. To prepare such high molecular weight compounds, it has been necessary to use high catalyst ratios and elevated temperatures. To a large extent these reaction conditions are self-defeating since under these conditions many side reactions take place and/or polyoxyalkylene chains are broken, thus it is difficult to obtain high molecular weight products. In the preparation of polyoxyalkylene compounds having molecular weights in excess of 1000, it is often found that the molecular weight of the product is only one-third or even less of the theoretical molecular weight that would be calculated from the quantity of alkylene oxide added to the reaction mixture. Another inherent shortcoming in the use of inorganic alkaline catalysts to prepare high molecular weight polyoxyalkylene compounds for use as synthetic lubricants, is that the resulting compositions contain an undesirably high inorganic residue which is difficult to remove and has a deleterious effect upon lubricating properties. A further shortcoming of the inorganic alkaline catalysts is their low catalytic activity. Consequently, it is necessary to run alkylene oxide condensation reactions under high pressures and/or high temperatures if satisfactory reaction rates are to be obtained.

It has been suggested that a number of organic bases such as the primary, secondary and tertiary amines can be used in lieu of the inorganic bases as catalysts in α,β alkylene oxide condensation reactions. For example, British Patent No. 610,505 suggests that trimethylhydroxyethylammonium hydroxide be used for this purpose. Such organic bases have the advantage that they can be removed from the product without leaving an inorganic residue, but in general their catalytic activity is so low that it is inexpedient to use such catalysts.

It is an object of this invention to provide a superior method for preparing oxyalkylene compounds by the catalystic condensation of an α,β alkylene oxide with an active hydrogen compound.

A further object is to provide a method of preparing high molecular weight polyoxyalkylene compounds which contain little or no inorganic residue.

Another object is to provide a method for preparing oxyalkylene compounds that can be carried out at materially lower temperatures and/or lower pressures than those presently employed.

Other objects and advantages of the present invention will become apparent from the following detailed description thereof.

It has been discovered that markedly superior results are obtained when an α,β alkylene oxide is condensed with an active hydrogen compound in the presence of a catalyst selected from the group consisting of benzyltrialkylammonium hydroxides and benzyltrialkylammonium alkoxides which have the following formula:

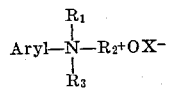

Where: Aryl is selected from the group consisting of phenyl and alkyl-substituted phenyl radicals, R₁, R₂, and R₃ are selected from the group consisting of methyl and ethyl radicals, and X is selected from the group consisting of hydrogen, aliphatic radicals and aromatic radicals.

The method of carrying out the condensation of an α,β alkylene oxide with an active hydrogen compound in the presence of a catalyst of the type set forth immediately above is materially superior to the method of carrying out the reaction in the presence of an inorganic base for the following reasons:

1. The reaction rate is materially faster, so that the reaction can be carried out at correspondingly lower temperatures and/or lower pressures.

2. The benzyltrialkylammonium hydroxides and benzyltrialkylammonium alkoxides are either directly distillable or break down at elevated temperatures to give products which are distillable and, as a result, it is possible to make high molecular weight polyoxyalkylene compounds for use as synthetic lubricants which contain no catalytic residues.

3. Since the reaction can be run at materially lower temperatures, it is not essential to run the reaction under rigorous anhydrous conditions.

4. The reaction can be run at appreciably lower catalyst concentrations.

Examples of the benzyltrialkylammonium hydroxides and alkoxides that may be employed in the process herein contemplated include benzyltrimethylammonium hydroxide, ortho, meta or paramethylbenzyltrimethylammonium hydroxide, benzyltriethylammonium hydroxide, benzylmethyldiethylammonium hydroxide, ortho, meta or paramethylbenzyltrimethylammonium methoxide, benzyltriethylammonium propoxide, parachlorobenzylmethyldiethylammonium phenoxide, etc. The benzyltrialkylammonium hydroxide and alkoxide catalyst employed are known compounds which are prepared by well-known methods. For example, the benzyltrialkylammonium hydroxides may be prepared by metathesis between the corresponding quaternary ammonium halide and silver hydroxide, whereas the quaternary ammonium alkoxides are prepared by metathesis between the quaternary ammonium halide and a sodium alkoxide. For further details as to general methods for the preparation of these catalysts, reference is made to Whitmore, F. C., Organic Chemistry, pp. 184–197, New York, D. Van Nostrand Company, Inc., 1937, and Allott, E. N., Richter's Organic chemistry, pp. 197–198, New York, Nordemann Publishing Company, Inc., 1934.

The procedural steps of carrying out the condensation of the $\alpha,\beta$ alkylene oxide with the active hydrogen compound are essentially the same as those employed when an inorganic base is used as the catalyst. Although the reaction may be carried out by simply heating a mixture of the reactants, under pressure if desired, this procedure is not ordinarily used since the temperatures and pressures required are excessive and control of the reaction is difficult. The preferred method of carrying out the reaction is to add the alkylene oxide to a stirred, heated mixture of the desired active hydrogen compound and benzyltrialkylammonium hydroxide in a sealed reaction vessel. By adding the $\alpha,\beta$ alkylene oxide to the reaction vessel at such a rate that it reacts as rapidly as added, an excess of alkylene oxide is avoided and control of the reaction is simplified. The temperature at which the reaction is run will depend upon the particular system in question and especially upon the catalyst concentration. Generally, at higher catalyst concentrations the reactions can be run at lower temperatures and correspondingly lower pressures. The temperature and pressure required for any given reaction will vary with the active hydrogen compound, the alkylene oxide and the type of concentration of catalyst.

The following examples are set forth to more clearly illustrate the principle and practice of this invention to those skilled in the art:

Example 1

Into a three-neck round bottom flask equipped with a mechanical stirrer, reflux condenser, thermometer and alkylene oxide feed inlet, were charged 148 grams (2 mols) of n-butanol and 21 grams (2.5 mol percent of the butanol) of a 40% aqueous solution of benzyltrimethylammonium hydroxide. One hundred and sixteen grams (2 mols) of propylene oxide was added to the flask over a period of 1.5 hours at a reaction temperature of 60° C. The propylene oxide was added to the reaction flask at approximately the rate at which it was reacting so that there was only a slight excess of propylene oxide in the flask at any one time. After the reaction was initiated, external cooling was required to maintain the temperature at 60° C. The reaction mixture was then distilled to obtain the following fractions:

| Fraction | Grams | Weight Percent |
| --- | --- | --- |
| Unreacted butanol | 49 | 17.2 |
| Propylene Glycol monobutyl ether | 117 | 40.0 |
| Dipropylene Glycol monobutyl ether | 45.5 | 16.0 |
| Higher boiling ethers | 18.0 | 6.3 |
| Loss, inter fractions, unreacted oxide, and catalyst decomposition products | 55.5 | 20.5 |
| | 285.0 | 100.0 |

Examples 2–4

In a manner analogous to that of Example 1, propylene oxide was added to n-butanol in an equal molar ratio in the presence of three different catalysts. Details as to the quantities of reactants employed, reaction temperatures and the specific catalyst are set forth in Table I below:

TABLE I

| | Example 2 | Example 3 | Example 4 |
| --- | --- | --- | --- |
| Mols n-butanol | 1 | 2 | 2 |
| Mols Propylene Oxide | 1 | 2 | 2 |
| Mol Ratio Oxide Alcohol | 1/1 | 1/1 | 1/1 |
| Catalyst | (a) | (b) | (c) |
| Catalyst, Mol percent of alcohol | 2.5 | 2.5 | 1.0 |
| Reaction Time, hours | 1.6 | 2.0 | 2.9 |
| Average Temperature, °C | 83 | 70 | 65 | a Benzyltrimethylammonium butoxide.
b Benzyltrimethylammonium hydroxide, 35% solution in methanol.
c Benzyltrimethylammonium hydroxide, anhydrous.

Example 5

The high catalytic activity of the benzyltrialkylammonium hydroxides is established by the fact that alkylene oxide condensations can be run at room temperatures. One hundred and forty-eight grams (2 mols) of n-butanol and 8.4 grams of anhydrous benzyltrimethylammonium hydroxide were charged into the apparatus described in Example 1 and 116 grams (2 mols) of propylene oxide was added thereto at a temperature of 25° C. over a period of 18.5 hours, the propylene oxide being added at the rate at which it reacted in the manner described in Example 1. Distillation of the product gave the same distillation fractions that are set forth in Example 1.

Example 6

Because of the extremely high catalytic activity of the benzyltrialkylammonium hydroxides, it is possible to run alkylene oxide condensation reactions in the presence of unusually small quantities of catalyst. In this example, 148 grams (2 mols) of n-butanol and 0.67 grams (0.1 mol percent of the butanol) of a 50% methanolic solution of benzyltrimethylammonium hydroxide were added to the apparatus described in Example 1 and 106 grams of propylene oxide was added thereto over a period of 13.5 hours at a temperature of 85° C. in the manner described in Example 1.

Example 7

One hundred and forty-eight grams (2 mols) of n-butanol and 21 grams (2.5 mol percent of the butanol) of a 40% aqueous solution of benzyltrimethylammonium hydroxide were added to the apparatus described in Example 1 and 1250 grams (21.6 mols) of propylene oxide was added thereto over a period of 18.1 hours at a temperature of 60–80° C. This example establishes that the benzyltrialkylammonium hydroxides and alkoxides are active catalysts in the preparation of high molecular weight polyoxyalkylene compounds.

Example 8

To compare the catalytic activity of sodium hydroxide and benzyltrimethylammonium hydroxide, 2 mols of propylene oxide was added to 2 mols of n-butanol at 85° C. in the presence of varied concentrations of the respective catalysts. The propylene oxide was added at the rate at which it reacted and the total elapsed time to complete the addition of the 2 mols of propylene oxide was measured. The results are set forth in Table II below:

TABLE II

| Mol Percent Catalyst (based on n-butanol) | Time, Hours | |
|---|---|---|
| | NaOH | Benzyltrimethylammonium hydroxide |
| 0.1 | | 13.5 |
| 1.0 | 9.7 | 3.9 |
| 2.5 | 4.5 | 1.5 |
| 5.0 | 2.9 | |
| 10.0 | 2.1 | |
| 15.0 | 1.0 | |
| 17.5 | 0.9 | |

Referring to Table II, it is seen that at an equal mol percent catalyst concentration the reaction time required with the benzyltrimethylammonium hydroxide was only about one third of that required with NaOH. In addition, in the reactions with sodium hydroxide external heating was required when the catalyst concentration was below 17.5 mol percent, whereas with benzyltrimethylammonium hydroxide the rate was sufficiently rapid that external cooling was required even at 1 mol percent catalyst concentration.

Example 9

The benzyltrialkylammonium hydroxides and alkoxides are materially superior in their catalytic activity to the quaternary ammonium hydroxides as a generic class. To illustrate this fact, 2 mols of propylene oxide was added to 2 mols of n-butanol at 85° C. in the presence of trimethylhydroxyethylammonium hydroxide and benzyltrimethylammonium hydroxide respectively. The results are set forth in Table III:

TABLE III

| Catalyst | Trimethylhydroxyethylammonium hydroxide | Benzyltrimethyl ammonium hydroxide |
|---|---|---|
| Catalyst concentration, Mol Percent based on butanol | 5.0 | 2.5 |
| Mol ratio oxide/alcohol | 1/1 | 1/1 |
| Reaction time, hours | 9.6 | 1.5 |
| Rate of oxide addition, mols/mol/hour | 0.107 | 0.665 |

Referring to Table III, it is seen that, even though used at only half the catalyst concentration, the benzyltrimethylammonium hydroxide has six times the catalytic activity of the trimethylhydroxyethylammonium hydroxide.

Examples 10–13

To demonstrate that the benzyltrialkylammonium hydroxides and alkoxides are efficient catalysts in other alkylene oxide condensation reaction, ethylene and propylene oxide were added to various active hydrogen compounds. The details of these reactions are set forth in Table IV.

TABLE IV

| | Example 10 | Example 11 | Example 12 | Example 13 |
|---|---|---|---|---|
| Active hydrogen compound | n-butanol | n-butanol | ethylene glycol | N-ethyl benzene sulfonamide. |
| Mols of active hydrogen compound | 2.0 | 2.0 | 2.0 | 1.0. |
| Alkylene oxide | ethylene oxide | ethylene oxide | propylene oxide | propylene oxide. |
| Mols of alkylene oxide | 51.0 | 23.4 | 14.5 | 5.5. |
| Mol ratio oxide/active hydrogen compound | 25.5/1 | 11.7/1 | 7.25/1 | 5.5/1. |
| Catalyst | (a) | (b) | (a) | (b) |
| Catalyst concentration, mol percent based on active hydrogen compound | 2.5 | 2.5 | 2.5 | 2.5. |
| Reaction Time, Hours | 48.5 | 27.3 | 23.0 | 13.8. |
| Reaction Temperature, °C | 85 | 92 | 75 | 85. | a 40% aqueous solution benzyltrimethylammonium hydroxide.
b Anhydrous benzyltrimethylammonium hydroxide.

What is claimed is:

1. The method of preparing oxyalkylene compounds, which comprises intimately contacting an $\alpha,\beta$ alkylene oxide with an active hydrogen compound in the presence of a catalyst selected from the group consisting of benzyltrialkylammonium hydroxides and benzyltrialkylammonium alkoxides having the formula:

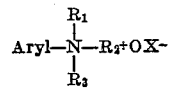

where:
Aryl is selected from the group consisting of phenyl and alkyl-substituted phenyl radicals,
$R_1$, $R_2$ and $R_3$ are selected from the group consisting of methyl and ethyl radicals, and
X is selected from the group consisting of hydrogen, aliphatic radicals and aromatic radicals.

2. The method of claim 1 wherein the condensation is carried out in the presence of benzyltrimethylammonium hydroxide.

3. The method of claim 1 wherein the condensation is carried out in the presence of benzyltrimethylammonium butoxide.

References Cited in the file of this patent

UNITED STATES PATENTS 2,053,708    Fife _____ Sept. 8, 1936

FOREIGN PATENTS 610,505    Great Britain _____ Oct. 18, 1948